United States Patent
Guerini et al.

(10) Patent No.: US 9,902,650 B2
(45) Date of Patent: Feb. 27, 2018

(54) CONSTRUCTION CASTABLE MATERIAL WITH CONTROLLABLE FLOW OR SLUMP

(71) Applicant: CEMEX RESEARCH GROUP AG, Bruegg, b. Biel (CH)

(72) Inventors: Alexander Guerini, Cressier (CH); Carlos Escott Perez, Biel/Bienne (CH)

(73) Assignee: CEMEX RESEARCH GROUP AG, Bruegg Bei Biel (CH)

( * ) Notice: Subject to any disclaimer, the term of this patent is extended or adjusted under 35 U.S.C. 154(b) by 0 days.

(21) Appl. No.: 15/022,389

(22) PCT Filed: Oct. 4, 2013

(86) PCT No.: PCT/EP2013/070662
§ 371 (c)(1),
(2) Date: Mar. 16, 2016

(87) PCT Pub. No.: WO2015/049010
PCT Pub. Date: Apr. 9, 2015

(65) Prior Publication Data
US 2016/0229747 A1    Aug. 11, 2016

(51) Int. Cl.
| | | |
|---|---|---|
| C04B 24/06 | (2006.01) |
| C04B 28/00 | (2006.01) |
| C04B 28/02 | (2006.01) |
| C04B 28/08 | (2006.01) |
| C04B 7/153 | (2006.01) |
| C04B 7/24 | (2006.01) |
| C04B 28/26 | (2006.01) |
| C04B 111/00 | (2006.01) |
| C04B 103/00 | (2006.01) |
| C04B 103/30 | (2006.01) |

(52) U.S. Cl.
CPC ............ *C04B 24/06* (2013.01); *C04B 7/1535* (2013.01); *C04B 7/243* (2013.01); *C04B 28/006* (2013.01); *C04B 28/008* (2013.01); *C04B 28/021* (2013.01); *C04B 28/08* (2013.01); *C04B 28/26* (2013.01); *C04B 2103/0082* (2013.01); *C04B 2103/308* (2013.01); *C04B 2111/00086* (2013.01); *C04B 2111/00103* (2013.01); *C04B 2111/00146* (2013.01); *Y02P 40/143* (2015.11); *Y02P 40/165* (2015.11); *Y02W 30/92* (2015.05); *Y02W 30/94* (2015.05); *Y02W 30/97* (2015.05)

(58) Field of Classification Search
CPC ......... C04B 12/04; C04B 14/06; C04B 18/08; C04B 18/141; C04B 22/062; C04B 24/06; C04B 24/2647; C04B 28/008; C04B 28/021; C04B 28/08; C04B 7/1535; C04B 7/243; C04B 2103/32; C04B 2111/0086; C04B 2111/00103; C04B 2111/00146
See application file for complete search history.

(56) References Cited

U.S. PATENT DOCUMENTS

| 4,328,039 A | 5/1982 | Masuda |
| 2013/0150487 A1* | 6/2013 | Brien ...................... C04B 14/00 524/2 |
| 2014/0264140 A1* | 9/2014 | Gong ...................... C04B 38/02 252/62 |
| 2015/0232385 A1* | 8/2015 | Beraldo ................ C04B 24/128 106/790 |

FOREIGN PATENT DOCUMENTS

| DE | 102008033447 B3 | 7/2008 |
| GB | 2 425 532 A * | 11/2006 |
| WO | WO 2006/126752 A1 * | 11/2006 |
| WO | 2009024829 A1 | 2/2009 |
| WO | 2011020975 A2 | 2/2011 |

OTHER PUBLICATIONS

K. Dombrowski, et al; Geopolymer binders Part 2: Development and optimization of geopolymer concrete mixtures for strong . . . ; ZKG International; vol. 61; No. 3; 2008; pp. 70-80.
A. Kusbiantoro, et al; Development of sucrose and citric acid as the natural based admixture for fly ash . . . ; SciVerse ScienceDirect; Procedia Environmental Sciences; vol. 17; 2013; pp. 596-602.
M. Palacios, et al; Effect of superplasticizer and shrinkage-reducing admixtures on alkali-activated slag pastes . . . ; ScienceDirect; Cement and Concrete Research; vol. 35; 2005; pp. 1358-1367.
D. Sabitha, et al; Reactivity, workability and strength of potassium versus sodium-activated high vol. fly ash . . . ; Research Article; Current Science; vol. 103; No. 11; 2012; XP55119432; pp. 1320-1327.
International Search Report and Written Opinion dated Jun. 3, 2014 for PCT/EP2013/070662.

* cited by examiner

*Primary Examiner* — Anthony J Green
(74) *Attorney, Agent, or Firm* — Lucas & Mercanti, LLP

(57) ABSTRACT

Construction castable material with controllable flow or slump comprising (a) a binder comprising fly ashes comprising from 1.5% to 35% by weight of CaO and a Lost on Ignition (LOI) value from 0.5% to 5.5% by weight, representing from 10% to 60% of the binder weight and ground granulated blast furnace slag comprising from 40% to 70% by weight of CaO and from 30 to 60% by weight of SiO2, representing from 40% to 90% of the binder weight, (b) an activator comprising alkaline reagents selected from the group composed by water glass, preferably in solution with 30 to 50% by weight solid content, sodium metasilicates and sodium hydroxide, (c) sand, fine and coarse aggregates and (d) organic acids or conjugated salts of organic acids in a dosage from 0.001% to 3% by weight with respect to the binder.

8 Claims, 4 Drawing Sheets

CONSTRUCTION CASTABLE MATERIAL WITH CONTROLLABLE FLOW OR SLUMP

CROSS REFERENCE TO RELATED APPLICATION

This Application is a 371 of PCT/EP2013/070662 filed on Oct. 4, 2013, application which is incorporated herein by reference.

FIELD OF THE INVENTION

The field of the invention relates to construction materials. Specifically, the present invention relates to construction materials comprising a binder containing fly ashes, ground granulated blast furnace slag and pozzolanas, an activator and aggregates, having self placing properties and exhibiting excellent workability retention.

BACKGROUND OF THE INVENTION

Construction material based on activated mixture of fly ash, slag or other sources of aluminosilicates, including or not cement clinker have been widely described.

The prior art related to these materials did not disclose the workability and workability retention of these materials. In WO2009024829 some flow properties have been given to show that the slump of those construction mixes could range from some centimeters to 25 cm, but no data are reported on the workability retention and the relation to the rheology parameters of the mixes. It could also be seen on WO2009024829 than high values of slump were related to high water/binder ratio, leading to poor early strength development.

Most of the available literature does not demonstrate any of the requirements of industrial applications (effect of large and small aggregates in large quantity, mixing, placing, segregation risk, transportation, etc.). The available literature is relevant from a chemical and reactivity stand point of view; however scaling up from paste tests (binder+activator+water) to real construction material for industrial application is not evident and many systems described as pastes have never been used as construction material due to the difficulty of solving the problems.

One of the known problems of these mixes is that their alkalinity is so high that normal admixture technology (based only on organic polymer like melamine or polycarboxilates-based superplasticizers) cannot be used successfully, and that the stability of the aggregates in the binder (paste) is not ensured leading to important segregation as soon as the slump increases. Segregation is inacceptable for industrial application since it yields heterogeneities and defaults.

Castable construction materials shall be offered in a wide range of workability, including pumpable and self compacting (SCC) mixes and a wide range of final strength from 20 to 80 Mpa. In addition, the really strength shall be high enough to enable the removal of the framework of moulds in less than 2 days.

Finally, the workability retention, (E.g. the capacity of the rheology parameters like flow, viscosity, yield stress, etc.) has to be high enough to encompass dispatching problems related to delay, traffic, etc. so the placing properties on the job site are not affected by logistics issues.

Therefore, the invention proposes a new robust construction material, comprising a binder containing fly ashes, ground granulated blast furnace slag and pozzolanas, an activator and aggregates. Said new construction material has placing properties that ranks from S1 to S5 and flow from F1 to F6 without segregation between aggregates and paste, developing an early strength higher or equal to 2 MPA after 1 day and having workability retention that ranks from 15 minutes to 180 minutes.

More likely, the invention targets to obtain slump from S3 and S5 and/or flow from F4 to F6, having workability retention from 30 minutes to 150 minutes, more likely from 30 minutes to 120 minutes.

DESCRIPTION OF THE INVENTION

A preferred embodiment of the invention is a construction castable material with controllable flow or slump comprising
(a) a binder comprising
fly ashes comprising from 1.5% to 35% by weight of CaO and a Lost on Ignition (LOI) value from 0.5% to 5.5% by weight, representing from 10% to 60% of the binder weight and
ground granulated blast furnace slag comprising from 40% to 70% by weight of CaO and from 30 to 60% by weight of $SiO_2$, representing from 40% to 90% of the binder weight,
(b) an activator comprising alkaline reagents selected from the group composed by water glass, preferably in solution with 30 to 50% by weight solid content, sodium metasilicates and sodium hydroxide,
(c) sand, fine and coarse aggregates and
(d) organic acids or conjugated salts of organic acids in a dosage from 0.001% to 3% by weight with respect to the binder, herewith construction castable material of the invention.

Metakaolin and recycled glass can also be present in the binder. Ground granulated blast furnace slag and natural pozzolanas are ground to a fineness of 93% passing 45 microns. Fly ashes are generally used as they arrive without pre mechanical processing.

The construction castable material is prepared combining the organic acids or conjugated salts of organic acids with the activator. The resulting product is later mixed with the binder and with aggregates from different nature and shape being the most common ones natural siliceous rounded aggregates from river, lake or sea origin and limestone based crushed angular aggregates; other sources of aggregates include construction demolition waste and concrete demolition waste.

Another embodiment is the construction castable material of the invention, wherein the binder in (a) comprises pozzolanas comprising alkali content, silica fumes, fillers, limestone (from natural or wastes sources), natural fibers, metallic fibers or polymeric fibers.

Another embodiment is the construction castable material of the invention, wherein said sodium metasilicates are pentahydrate sodium metasilicates.

Another embodiment is the construction castable material of the invention, wherein in (d), said organic acid is selected from the group composed by tartaric acid, aldaric acid, citric acid, maleic acid and salicylic acid. Particularly, said organic acid is tartaric acid.

Tartaric acid has been found to be the most effective and better performing addition in terms of setting time and strength development of cementitious mixes.

The use of tartaric acid increases up to 100% compressive strength at late ages. The constructions castable material of the invention is specifically interesting for specific applications: blocks and bricks, due to the ability of reducing binder and water to binder ratio.

The use of tartaric acid (naturally or chemically produced) has many advantages. For example, tartaric acid can be dosed in powder or liquid.

Powder tartaric acid should be stored in dry places. Tartaric acid is not chemically transformed in the presence of moisture; however, moisture should be avoided as pellets can be formed in the presence of moisture. The liquid version guarantees accuracy in the dosage and the possibility of premixing with other admixtures.

The use of tartaric acid reduces PCE consumption and enhances mechanical properties of construction materials. Tartaric acid is widely produced around the world making its use cost effective.

Another embodiment is the construction castable material of the invention, wherein (d) comprises Polycarboxylate Ether Polymers (PCE). Particularly, the concentration range of said Polycarboxylate Ether Polymers is from 0.12% to 0.75% by weight of binder.

The water to binder ratio has been chosen to be between 0.41 and 0.6, with most of the presented results having water to binder ratio of around 0.45. Ratios below 0.4 don't allow obtaining obtain acceptable fresh properties in terms of workability. Ratios higher than 0.6 present risk of segregation and decrease in strength development.

The binder comprises fly ash and the slag. Advantageously, the amount of fly ash will be optimized to reduce the costs of the mix; however, depending of the initial strength required, the content of slag will be increased.

According to the invention, and with respect to the total binder weight, the slag is from 40% to 90% and the fly ash is ranging from 10% to 60%. Most of the examples in this invention are given for an average slag of around 70%. Most preferably, the ratio between fly ash and slag is located between 1 and 9.

The solid active content of the mix of activators 1 and 2 (the global activated) represents typically between 3% and 10% of the binder content. In the examples, this ratio is around 6% to 7%, however the invention covers concrete designs with activators mix that represent more advantageously values located between 4.5% to 8% of the binder content.

Advantageously, the solid active contents of activator 1 and activator 2 in the activator mix are respectively in the ranges 2.5:1 and 0.5:1. Increasing activator 2 content in the activator mix is advantageous when the % of the fly ash in the binder increases over 65% with high initial strength.

Said construction material using such activators and water to binder ratio in combination with tartaric acid has also the characteristic of maintaining its workability during a controllable period of time between 30 to 240 minutes being the optimal frame of time from 45 to 180 min.

Workability retention would allow concrete to travel and be placed in sites in a wider range of kilometers from the production place. This property is also dependant on the amount of tartaric acid added to the concrete mix to increase its workability. Geopolymer reaction starts over again after tartaric acid has no further effect on the workability of the mix.

List of Definitions

Hydraulic binder. It is a material with cementing properties that sets and hardens due to hydration even under water. Hydraulic binders produce calcium silicate hydrates also known as CSH.

Cement. It is a binder that sets and hardens and brings materials together. The most common cement is the ordinary Portland cement (OPC) and a series of Portland cements blended with other cementitious materials.

Ordinary Portland cement. Hydraulic cement made from grinding clinker with gypsum. Portland cement contains calcium silicate, calcium aluminate and calcium ferroaluminate phases. These mineral phases react with water to produce strength.

Hydration. It is the mechanism through which OPC or other inorganic materials react with water to develop strength. Calcium silicate hydrates are formed and other species like ettringite, monosulfate, Portlandite, etc.

Geopolymerization. It is the reaction from the interaction of an alkaline solution (activator) with a reactive aluminosilicate powder (binder). Geopolymerization comprises a dissolution phase and a condensation phase developing a 3D network of silico-aluminate materials linked with covalent bonding.

Alkali Activated cements. Low or zero clinker cements activated by the use of caustic alkalis or alkaline salts Mineral Addition. Mineral admixture (including the following powders: silica fume, fly ash, slags) added to concrete to enhance fresh properties, compressive strength development and improve durability.

Silica fume. Source of amorphous silicon obtained as a byproduct of the silicon and ferrosilicon alloy production. Also known as microsilica.

Fibers. Material used to increase concrete's structural performance. Fibers include: steel fibers, glass fibers, synthetic fibers and natural fibers.

Alumino silicate-by-product (Fly Ash—bottom ash). Alkali reactive binder components that together with the activator form the cementitious paste. These minerals are rich in alumina and silica in both, amorphous and crystalline structure.

Natural Pozzolan. Aluminosilicate material of volcanic origin that reacts with calcium hydroxide to produce calcium silicate hydrates or CSH as known in Portland cement hydration.

Filler inert. Material that does alter physical properties of concrete but does not take place in hydration reaction.

Admixture. Chemical species used to modify or improve concrete's properties in fresh and hardened state. These could be air entrainers, water reducers, set retarders, superplasticizers and others.

Silicate. Generic name for a series of compounds with formula $Na_2O.nSiO_2$. Fluid reagent used as alkaline liquid when mixed with sodium hydroxide. Usually sodium silicate but can also comprise potassium and lithium silicates. The powder version of this reagent is known as metasilicates and could be pentahydrates or nonahydrates. Silicates are referred as Activator 2 in examples in this application.

Sodium Hydroxide. It is an inorganic compound with formula NaOH also known as caustic soda or lye that is used for chemical activation. Sodium hydroxide is referred as Activator 1 in examples in this application.

Chemical activation. It refers to the use of chemical reagents to promote aluminosilicates dissolution to increase reactivity of binder components.

PCE. Polycarboxylic Acid Co-Polymers used as a class of cement and concrete admixtures, and are comb type polymers that are based on: a polymer backbone made of acrylic, methacrylic, maleic acid, and related monomers, which is grafted with polyoxyalkylene side-chain such as EO and/or PO. The grafting could be, but is not limited to, ester, ether, amide or imide.

Initial dispersant. It is a chemical admixture used in hydraulic cement compositions such as Portland cement concrete, part of the plasticizer and superplasticizer familiy, which allow a good dispersion of cement particles during the initial hydration stage.

Superplasticizers. It relates to a class of chemical admixture used in hydraulic cement compositions such as Portland cement concrete having the ability to highly reduce the water demand while maintaining a good dispersion of cement particles. In particular, superplasticizers avoid particle aggregation and improve the rheological properties and workability of cement and concrete at the different stage of the hydration reaction.

Coarse Aggregates. Manufactured, natural or recycled minerals with a particle size greater than 8 mm and a maximum size lower than 32 mm.

Fine Aggregates. Manufactured, natural or recycled minerals with a particle size greater than 4 mm and a maximum size lower than 8 mm.

Sand. Manufactured, natural or recycled minerals with a particle size lower than 4 mm.

Concrete. Concrete is primarily a combination of hydraulic binder, sand, fine and/or coarse aggregates, water. Admixture can also be added to provide specific properties such as flow, lower water content, acceleration, etc.

Pourable construction materials. A materials is consider as pourable as soon as its fluidity (with our without vibration) allow to full fill a formwork or to be collocate in a definite surface.

Construction materials. It refers to any material that can be use to build construction element or structure. It includes concrete, masonries (bricks—blocks), stone, ICF, etc.

Structural applications. A construction material is considered as structural as soon as the compressive strength of the material is greater than 25 MPa.

Workability. The workability of a material is measure with a slump test (see below).

Workability retention. It is the capability of a mix to maintain its workability during the time. The total time required depends on the application and the transportation.

Strength development—setting/hardening. The setting time starts when the construction material changes from plastic to rigid. In the rigid stage the material cannot be poured or moved anymore. After this phase the strength development corresponding to the hardening of the material.

Consistency of the concrete. Consistency reflects the rheological properties of fresh concrete by means of flow and slump as defined below:

TABLE 1

Consistency of concrete (slump)

| EN 206-1 | | NF P 18-305 | |
| --- | --- | --- | --- |
| Class | slump [mm] | Consistency | slump [mm] |
| S1 | 10 to 40 | Stiff | 0 to 40 |
| S2 | 40 to 90 | Plastic | 50 to 90 |
| S3 | 100 to 150 | highly plastic | 100 to 150 |
| S4 | 16 to 210 | fluid | >160 |
| S5 | >220 | | |

TABLE 2

Consistency of concrete (flow)
EN 206-1

| Class | Flow [mm] |
| --- | --- |
| F1 | <340 |
| F2 | 350-410 |
| F3 | 420-480 |
| F4 | 490-550 |
| F5 | 560-620 |
| F6 | >630 |

EXAMPLES OF THE INVENTION

Example 1. Concrete Admixture. Chemical Composition

Figure 1:
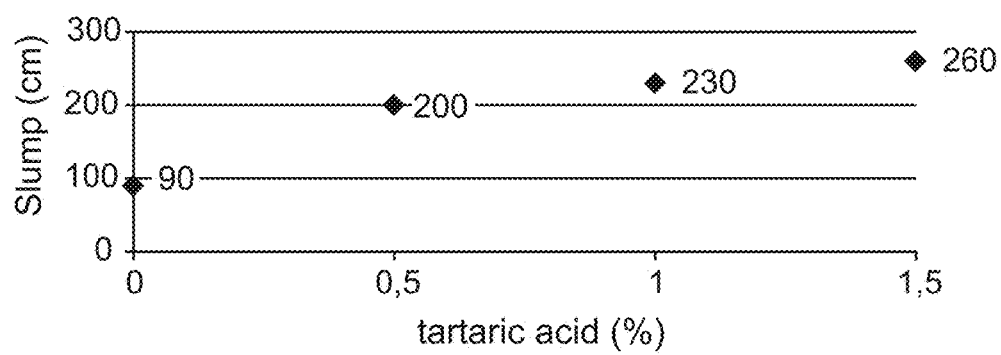
FIG. 1 plots tartaric acid effect on initial workability for a slag concrete.

A concrete mix composition used in the examples is shown below.

TABLE 3

| | Weight (Kg/m3) |
| --- | --- |
| Ground Granulated Blast Furnace Slag | 315 |
| Fly ashes | 135 |
| Mixing water | 191.1 |
| Activator 1 | 22.5 |
| Activator 2 | 45 |
| Tartaric Acid | 2.3 |
| Aggregates 0-4 | 666.5 |
| Aggregates 4-8 | 320.1 |
| Aggregates 8-16 | 614.5 |
| Water/binder ratio | 0.72 |

Fly ash, blast furnace slag and natural pozzolanas compositions used in the examples are given in Tables 3, 4 and 5 respectively.

TABLE 4

Chemical composition of several fly ashes samples by X-ray diffraction

|  | 1 | 2 | 3 | 4 | 5 | 6 | 7 | 8 |
|---|---|---|---|---|---|---|---|---|
| $SiO_2$ (%) | 60.83 | 58.64 | 57.41 | 34.17 | 49.61 | 41.86 | 53.42 | 57.39 |
| $Al_2O_3$ (%) | 20.85 | 23.06 | 18.48 | 12.85 | 24.34 | 26.22 | 33.65 | 22.00 |
| $Fe_2O_3$ (%) | 5.05 | 6.09 | 8.06 | 2.02 | 14.72 | 18.90 | 5.35 | 6.94 |
| CaO (%) | 2.19 | 1.90 | 3.78 | 34.03 | 3.70 | 7.94 | 1.25 | 2.64 |
| MgO (%) | 1.56 | 1.31 | 1.89 | 5.47 | 1.62 | 1.36 | 0.85 | 1.95 |
| $SO_{35}$ (%) | 0.36 | 0.25 | 0.35 | 1.74 | 0.39 | 0.82 | 0.01 | 0.24 |
| $Na_2O$ (%) | 0.35 | 0.25 | 1.03 | 0.11 | 0.47 | 0.18 | 0.28 | 0.73 |
| $K_2O$ (%) | 1.53 | 1.74 | 2.07 | 1.19 | 1.18 | 1.25 | 0.97 | 1.92 |
| $TiO_2$ (%) | 1.01 | 1.65 | 0.83 | 0.62 | 1.76 | 0.94 | 3.23 | 1.10 |
| $P_2O_5$ (%) | 0.24 | 0.43 | 0.17 | 0.05 | 0.20 | 0.40 | 0.04 | 0.34 |
| $Mn_2O_3$ (%) | 0.05 | 0.08 | 0.09 | 0.84 | 0.10 | 0.06 | 0.24 | 0.07 |
| LOI 950 C. (%) | 4.18 | 2.50 | 4.17 | 5.38 | 1.16 | 0.70 | 0.52 | 4.92 |
| Sum (%) | 98.21 | 97.89 | 98.33 | 98.47 | 99.27 | 100.64 | 99.81 | 100.24 |

TABLE 5

Chemical composition of ground granulated blast furnace slag samples by X-ray diffraction

|  | 1 | 2 | 3 | 4 | 5 | 6 | 7 | 8 |
|---|---|---|---|---|---|---|---|---|
| $SiO_2$ (%) | 33.98 | 32.62 | 32.20 | 32.39 | 35.88 | 34.83 | 36.80 | 34.83 |
| $Al_2O_3$ (%) | 14.70 | 14.13 | 14.21 | 14.07 | 10.61 | 11.48 | 10.94 | 11.48 |
| $Fe_2O_3$ (%) | 1.46 | 1.11 | 0.58 | 0.47 | 0.57 | 0.37 | 0.40 | 0.37 |
| CaO (%) | 42.08 | 41.92 | 41.99 | 42.21 | 41.17 | 41.46 | 41.15 | 41.46 |
| MgO (%) | 3.97 | 6.19 | 6.52 | 6.49 | 7.74 | 6.98 | 8.62 | 6.98 |
| $SO_{35}$ (%) | 1.63 | 2.76 | 1.84 | 1.96 | 1.52 | 2.39 | 2.20 | 2.39 |
| $Na_2O$ (%) | 0.18 | 0.20 | 0.16 | 0.21 | 0.00 | 0.34 | 0.22 | 0.34 |
| $K_2O$ (%) | 0.31 | 0.38 | 0.29 | 0.37 | 0.35 | 0.39 | 0.37 | 0.39 |
| $TiO_2$ (%) | 0.58 | 0.52 | 0.49 | 0.49 | 0.55 | 1.64 | 0.56 | 1.64 |
| $P_2O_5$ (%) | 0.02 | 0.01 | 0.00 | 0.01 | 0.01 | 0.01 | 0.38 | 0.32 |
| $Mn_2O_3$ (%) | 0.34 | 0.31 | 0.29 | 0.36 | 0.42 | 0.32 | 0.01 | 0.01 |
| LOI 950 C. (%) | −0.87 | −0.91 | 0.73 | −0.50 | 0.26 | 0.00 | −0.95 |  |
| Sum (%) | 98.37 | 99.24 | 99.32 | 98.55 | 99.10 | 100.21 | 100.67 | 100.21 |

TABLE 6

Chemical composition of natural pozzolanas obtained by X-ray diffraction

|  | 1 | 2 | 3 |
|---|---|---|---|
| $SiO_2$ (%) | 70.23 | 63.86 | 56.25 |
| $Al_2O_3$ (%) | 15.52 | 16.17 | 18.72 |
| $Fe_2O_3$ (%) | 2.21 | 3.66 | 6.88 |
| CaO (%) | 2.08 | 2.59 | 4.55 |
| MgO (%) | 0.37 | 0.52 | 1.66 |
| $SO_{35}$ (%) | 0.00 | 0.00 | 0.02 |
| $Na_2O$ (%) | 2.62 | 1.83 | 2.12 |
| $K_2O$ (%) | 3.53 | 3.01 | 2.15 |
| $TiO_2$ (%) | 0.28 | 0.43 | 1.02 |
| $P_2O_5$ (%) | 0.01 | 0.04 | 0.28 |
| $Mn_2O_3$ (%) | 0.11 | 0.26 | 0.15 |

Example 2. Dosage of Tartaric Acid in the Admixture. Effect of Tartaric Acid on Slump, Strength, Rheological Results and Placing Characteristics The influence of tartaric acid as workability modifier has been evaluated, using slag concrete having a binder to aggregates ratio of 0.28, water to binder ratio of 0.5 and an activator to binder ratio of 0.2.

The slump (in cm) was measured in order to compare different dosages of tartaric acid. FIG. 1 shows the comparative chart for additions from 0 to 1.5% tartaric acid to illustrate the effect on the slag based concrete workability after mixing.

Figure 2:
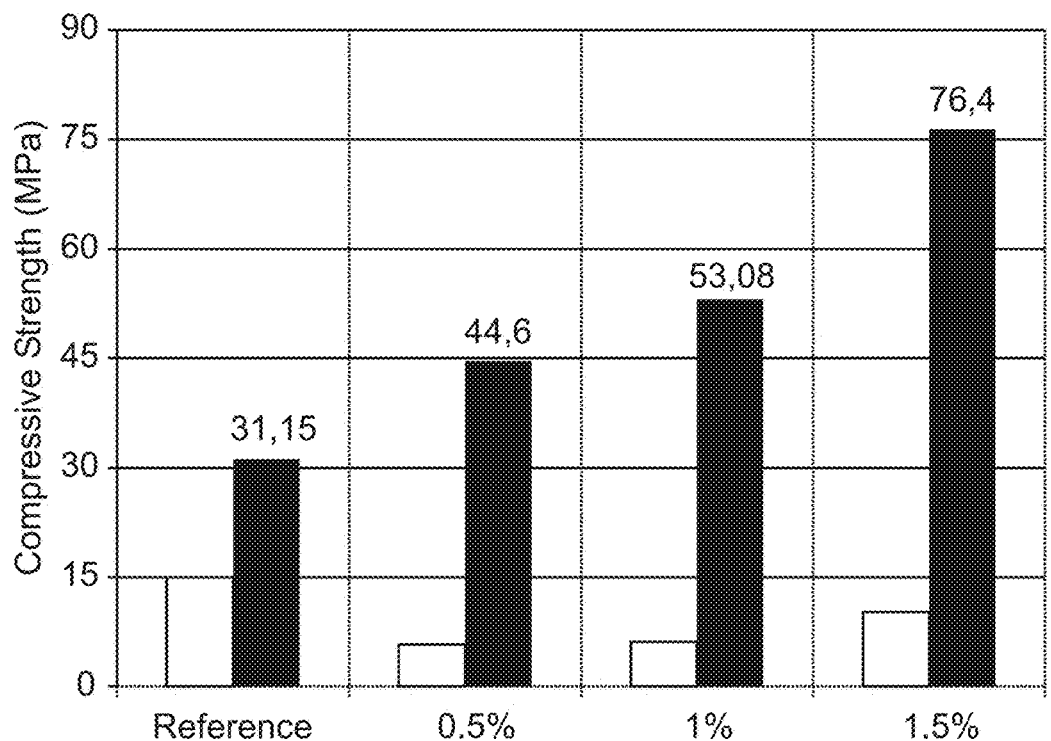
FIG. 2 plots compressive strength development after 2 days (white bars) and 28 days (black bar) for slag concrete containing 0% to 1.5% tartaric acid to modify initial workability.

Compressive strength tests showed that even though early age strength is less than the reference, the final strength, after 28 days, is improved. FIG. 2 is an example of such effect on the mechanical properties of activated concretes when using tartaric acid.

As can be seen on FIG. 1 the concrete not having tartaric acid had lower slump cone test value (class S4). The slump increased from 9 cm to 26 cm without modifying water content or activator dosage. As already mentioned, there was also an effect on strength development while having a 28 days compressive strength of 31.15 MPa other mixes containing tartaric acid have developed more than 44.6 MPa and up to 76.4 MPa.

Figure 3:
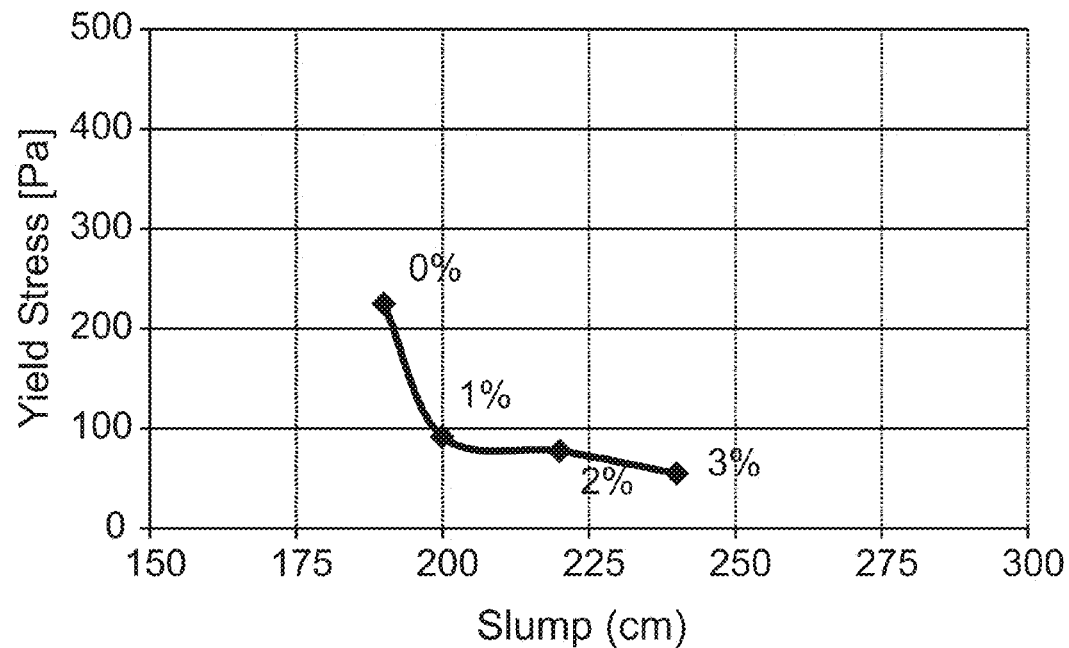
FIG. 3 plots yield stress for a geopolymer concrete containing 250 kg/m3 binder and different tartaric acid dosages (from 0 to 3% with respect to binder).
Figure 5:
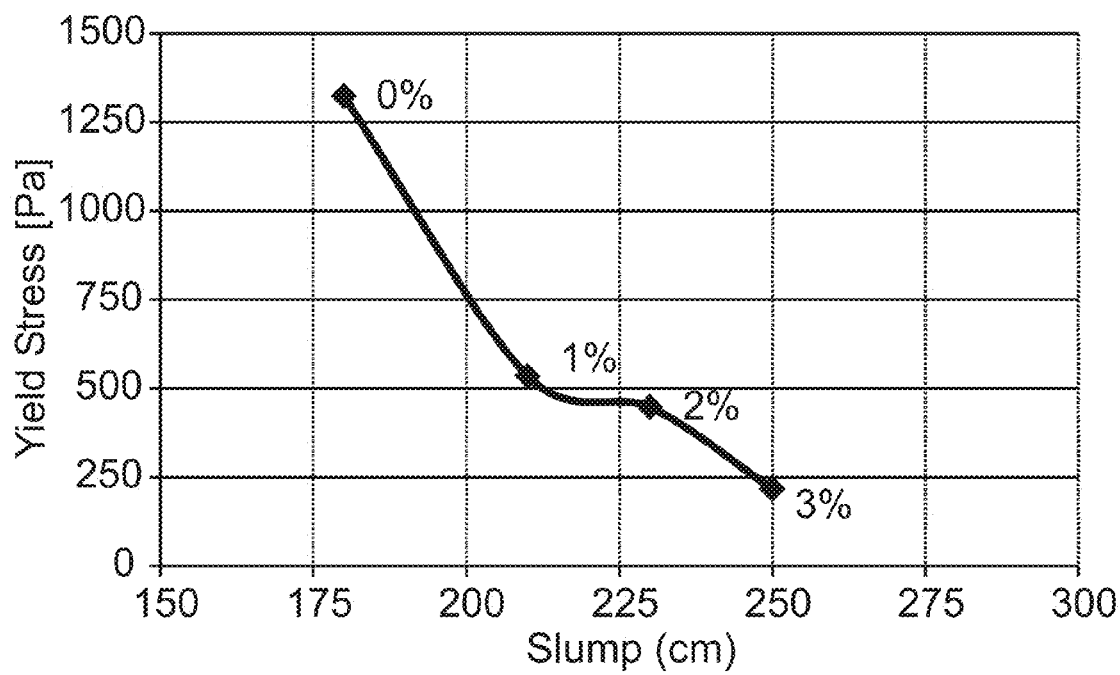
FIG. 5 plots initial yield stress vs. slump for a 450 kg/m3 binder geopolymer concrete. The higher the tartaric acid dosage, the lower the yield stresses.

Rheological properties have been determined for geopolymer concretes containing 300 kg/m3 (FIG. 3) and 450 kg/m3 binder (FIG. 5). Results are shown in FIGS. 3 and 5. Higher binder content has also been tested and is considered in this invention, typically up to 600 kg/m3.

According to these results it is possible to determine how the yield stress (Pa), minimum stress to be exceeded for a structured fluid to flow, decreases as the slump increases. This means that by having a higher dosage of tartaric acid the slump of the concrete increases and the yield stress decreases.

Figure 4:
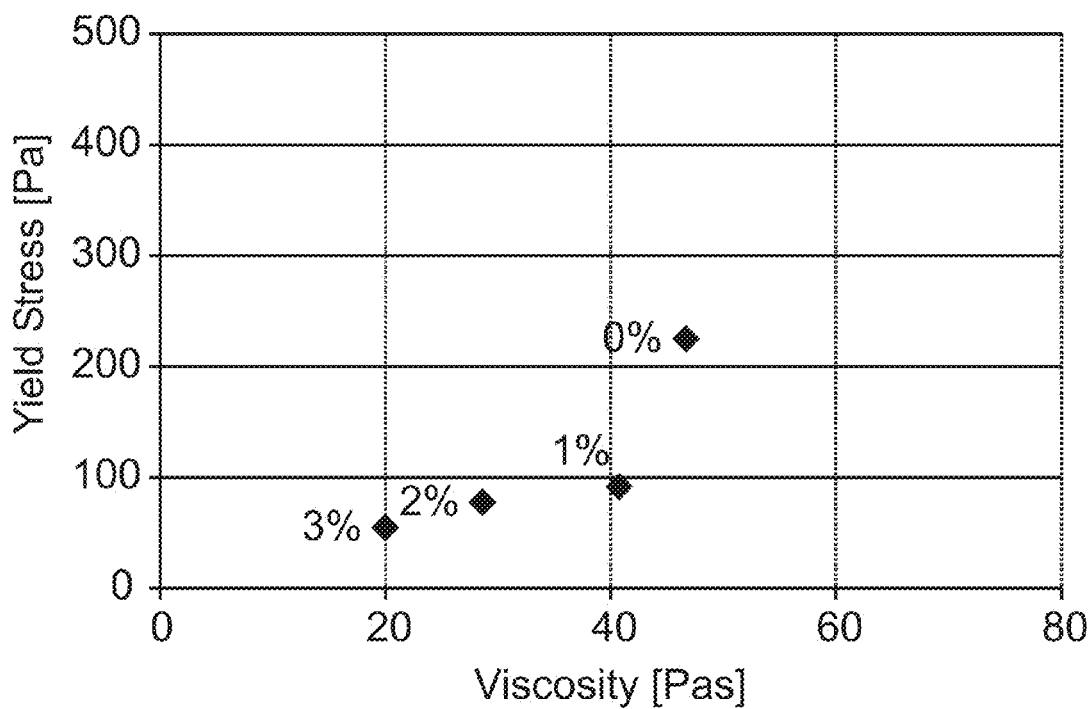
FIG. 4 plots yield stress vs. viscosity for a 250 kg/m3 binder geopolymer concrete. The higher the dosage of tartaric acid the lower the viscosity and the yield stress.
Figure 6:
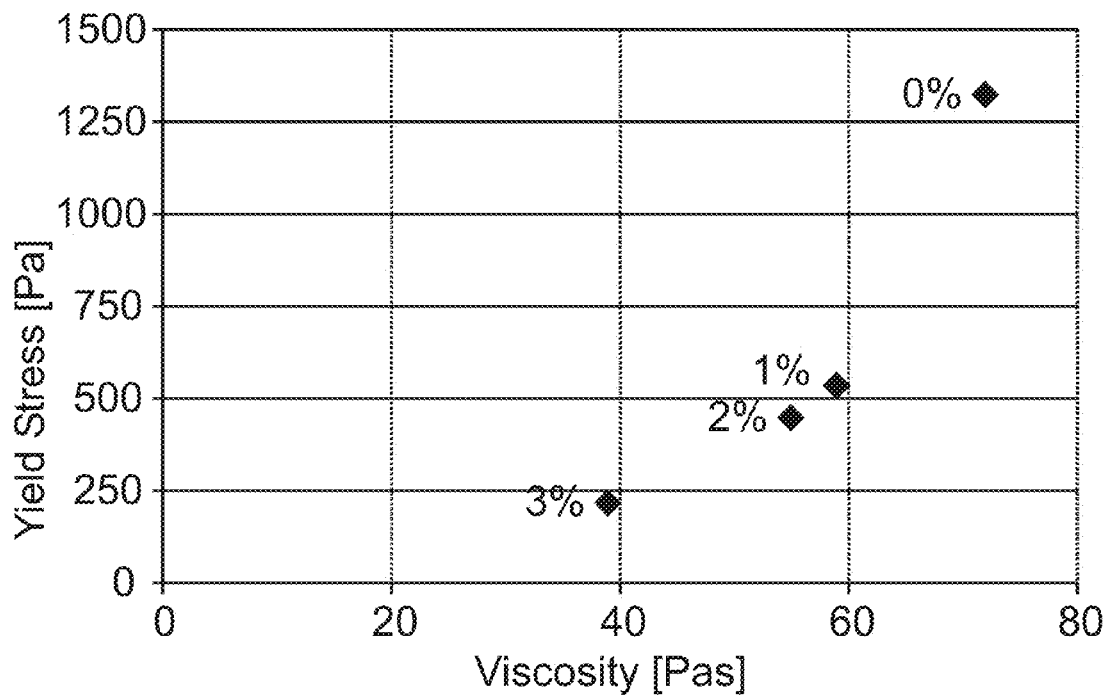
FIG. 6 plots yield stress vs. viscosity in a 450 kg/m3 binder geopolymer concrete.

FIGS. 4 and 6 plots the yield stress previously referred in function of the viscosity. It can be seen that at 0% tartaric acid the stress/viscosity value is the highest while the 3% tartaric acid with respect to binder content has reduced this value towards lower viscosity and lower yield stress in both cases, with different binder content.

It has been observed that by using tartaric acid in the geopolymer concrete mix design it is possible to maintain fresh workability during longer open time. Somehow the characteristic rapid setting of geopolymer concrete is altered by the use of the tartaric acid giving as a result the workability retention of concrete ready mixes up to 120 min, as can be shown in Table 7.

TABLE 7

|  | Ref | Ref-1 | MX01 | MX01-1 |
|---|---|---|---|---|
| Coarse Aggregate 1 Kg/m$^3$ | 480 | 480 | 480 | 480 |
| Coarse Aggregate 2 Kg/m$^3$ | 360 | 360 | 360 | 360 |
| Fine Aggregates Kg/m$^3$ | 770 | 770 | 770 | 770 |
| Slag Kg/m$^3$ | 315 | 315 | 315 | 315 |
| Fly Ash Kg/m$^3$ | 135 | 135 | 135 | 135 |
| Water/Binder Kg/m$^3$ | 0.45 | 0.45 | 0.45 | 0.45 |
| Activator 1 Kg/m$^3$ | 45 | 45 | 45 | 45 |
| Activator 2 Kg/m$^3$ | 22.5 | 22.5 | 22.5 | 22.5 |
| PCE Kg/m$^3$ | 0 | 3 | 0 | 0.5 |
| Tartaric Acid Kg/m$^3$ | 0 | 0 | 1 | 1 |
| Slump (cm) | 8 | 11 | 23 | 26 |
| Setting time (min) | 30 | 30 | 120 | 120 |

A higher plasticizing effect is achieved when tartaric acid is combined with PCE. If no tartaric acid is added to the mixture, a higher amount of PCE is required, and low performance is obtained.

Figure 7:
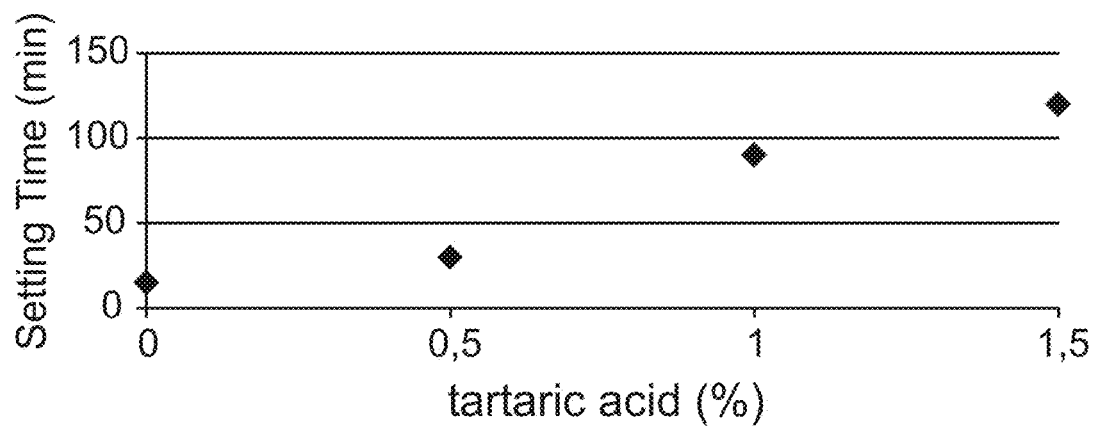
FIG. 7 plots workability retention (open time) of geopolymer concrete mixes containing 0% to 1.5% tartaric acid with respect to binder.
Figure 8:
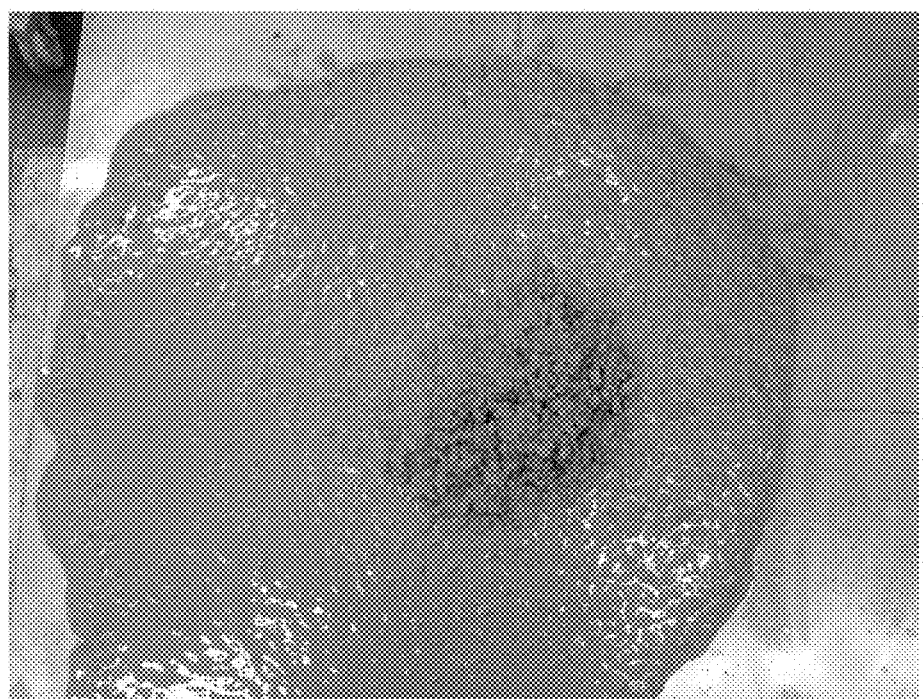
FIG. 8 is a picture of a mix design showing strong segregation between paste and aggregates when the water binder ratio is too high or when the dosage of the aldaric acids is too high.

It was observed from the various tests that dosages of admixtures larger than the one described (3% of organic acid and 0.75 ASC % of PCE with respect to binder) will lead to a very unstable mix design (segregation, bleeding) and will dramatically affect the setting time and strength development of the construction material as can be seen in the FIG. 7.

Strong segregation between paste and aggregates occurs when the water binder ratio and/or the dosage of the aldaric acids is too high (see FIG. 7).

The invention claimed is:

1. A construction castable material with controllable flow or slump comprising
   (a) a binder comprising
      fly ashes comprising from 1.5% to 35% by weight of CaO and a Lost on Ignition (LOI) value from 0.5% to 5.5% by weight, representing from 10% to 60% of the binder weight,
      and
      ground granulated blast furnace slag comprising from 40% to 70% by weight of CaO and from 30 to 60% by weight of SiO2, representing from 40% to 90% of the binder weight;
   (b) an activator mix comprising alkaline reagents composed by water glass, sodium metasilicates and sodium hydroxide, wherein a solid active content of sodium metasilicates and sodium hydroxide in the activator mix is in the range of 2.5:1 and 0.5:1, respectively;
   (c) sand, fine and coarse aggregates, water; and
   (d) organic acids or conjugated salts of organic acids in a dosage from 0.001% to 3% by weight with respect to the binder, the organic acid is tartaric acid, aldaric acid, or maleic acid;
wherein a ratio between a solid active content of said activator mix to the total binder content is between 4.5 weight % and 8 weight %; and
wherein the construction castable material with controllable flow provides a consistency of concrete slump of class between S3 and S5 and/or consistency of concrete flow of class between F4 and F6, and a workability retention time of from 30 minutes to 150 minutes.

2. The construction castable material according to claim 1, wherein the binder in (a) comprises pozzolanas.

3. The construction castable material according to claim 1, wherein said sodium metasilicates are pentahydrate sodium metasilicates.

4. The construction castable material according to claim 1, wherein (d) further comprises Polycarboxylate Ether Polymers (PCE).

5. The construction castable material according to claim 4, wherein the concentration range of said Polycarboxylate Ether Polymers is from 0.12% to 0.75% by weight of binder.

6. The construction castable material according to claim 1, wherein in (b) the alkaline reagents composed by water glass is in a solution with 30 to 50% by weight solid content.

7. The construction castable material according to claim 1, wherein the binder in (a) further comprises natural fibers, metallic fibers or polymeric fibers.

8. The construction castable material according to claim 1, wherein the binder in (a) further comprises alkali content, silica fumes, fillers or limestone.

* * * * *